(12) United States Patent
Knawa et al.

(10) Patent No.: US 9,613,320 B2
(45) Date of Patent: Apr. 4, 2017

(54) ROLE-BASED PRODUCT MANAGEMENT SYSTEM USING PROXY OBJECTS

(75) Inventors: David P. Knawa, Vail, AZ (US); Craig Edward McDonel, Bothell, WA (US); Mark A. Dahl, Kent, WA (US); Steven E. Franzen, Saint Charles, MO (US); Donna Wynn McWaters, Norwalk, CA (US); Darwin G. Reed, Spanaway, WA (US); Robert J. Schreiber, Kirkwood, MO (US); Geraldine Rae Summers, Covington, WA (US)

(73) Assignee: THE BOEING COMPANY, Chicago, IL (US)

(*) Notice: Subject to any disclaimer, the term of this patent is extended or adjusted under 35 U.S.C. 154(b) by 1392 days.

(21) Appl. No.: 13/159,058

(22) Filed: Jun. 13, 2011

(65) Prior Publication Data

US 2012/0316668 A1 Dec. 13, 2012

(51) Int. Cl.
*G06F 19/00* (2011.01)
*G06Q 10/00* (2012.01)

(52) U.S. Cl.
CPC .................... *G06Q 10/00* (2013.01)

(58) Field of Classification Search
USPC .......... 700/103; 707/601, 608; 705/22, 7.12, 705/1.1, 7.11, 2.27
See application file for complete search history.

(56) References Cited

U.S. PATENT DOCUMENTS

| | | | |
|---|---|---|---|
| 6,336,118 B1 * | 1/2002 | Hammond | |
| 7,606,717 B2 | 10/2009 | Seetharaman et al. | |
| 8,239,362 B1 | 8/2012 | Frazier | |
| 2002/0060696 A1 | 5/2002 | Seetharaman et al. | |
| 2005/0022208 A1 * | 1/2005 | Bolar et al. | 719/315 |
| 2005/0114661 A1 | 5/2005 | Cheng et al. | |
| 2008/0065580 A1 | 3/2008 | Spence et al. | |
| 2008/0177639 A1 | 7/2008 | Kuppersmith et al. | |

(Continued)

FOREIGN PATENT DOCUMENTS

| | | |
|---|---|---|
| CN | 102024198 A | 4/2011 |
| EP | 1536309 A1 | 6/2005 |
| JP | 2004341748 A | 12/2014 |

OTHER PUBLICATIONS

Oberweis et al., "INCOME/WF—A Petri Net Based Approach to Workflow Management" In Proc. of Wirtschaftsinformatik'97 (1997), pp. 1-19.*

(Continued)

*Primary Examiner* — Mohammad Ali
*Assistant Examiner* — Emilio J Saavedra
(74) *Attorney, Agent, or Firm* — Yee & Associates, P.C.

(57) ABSTRACT

A method and apparatus for identifying information for a product. User input selecting a proxy object in a product design on a computer system is received. The proxy object refers to a number of product standards used in the product design and is associated with a component in the product design. A role of a user is identified. A request for standards information for the component is sent to an interpreter module. The role of the user is included in the request. The standards information is received in a format based on the role of the operator such that the standards information is displayed in the computer system.

20 Claims, 10 Drawing Sheets

(56) References Cited

U.S. PATENT DOCUMENTS

2009/0259440 A1 10/2009 Reed et al.
2009/0265378 A1 10/2009 Dahl et al.

OTHER PUBLICATIONS

Peng et al., "A step toward STEP-compatible engineering data management: the data models of product structure and engineering changes" Robotics and Computer-Integrated Manufacturing vol. 14 Issue 2, Apr. 1998 pp. 89-109.*
Reed et al., "Improving the Aircraft Design Process Using Web-Based Modeling and Simulation" ACM Transactions on Modeling and Computer Simulation vol. 10 Issue Jan. 1, 2000, pp. 58-83.*
Xu et al., "A web-enabled PDM system in a collaborative design environment" vol. 19 Iddue 4, Aug. 2003 pp. 315-328.*
Zhang et al., "A review of Internet-based product information sharing and visualization" Computers in Industry, vol. 54, Issue 1, May 2004, pp. 1-15.*
Hillebrand et al. , "Integration-Based Cooperation in Concurrent Engineering" Enterprise Distributed Object Computing Workshop, 1998. EDOC '98. Proceedings. pp. 344-355.*
EP search report dated Sep. 17, 2012 regarding application 12168282.7-2221, reference NAM/P122462EP00, applicant The Boeing Company, 8 pages.
U.S. Appl. No. 12/813,915, filed Jun. 11, 2010, Frazier.
Chinese Patent Office Action and Translation, dated Jun. 2, 2016, regarding Application No. CN201210194877, 14 pages.
Japanese Office Action, dated Jun. 14, 2016, regarding application No. 2012-132643, 4 pages.
Canadian Intellectual Property Office Examination Search Report, dated Sep. 3, 2015, regarding Application No. 2,775,211, 6 pages.

* cited by examiner

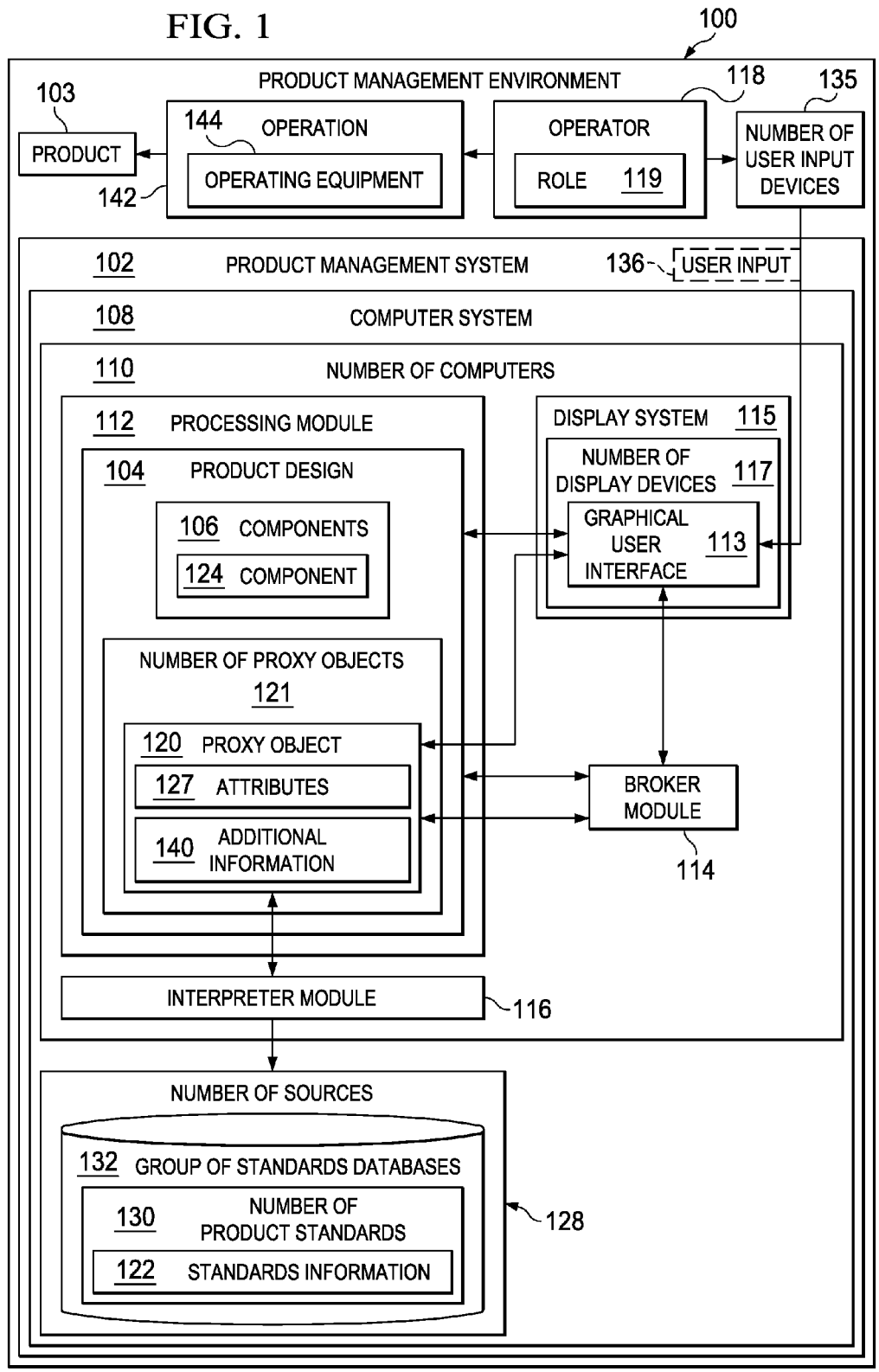

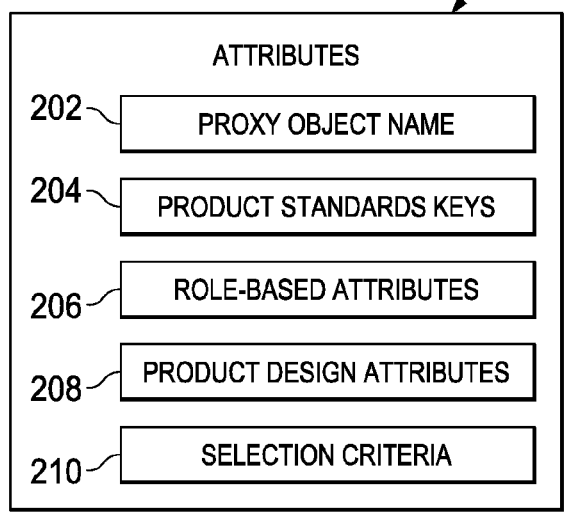
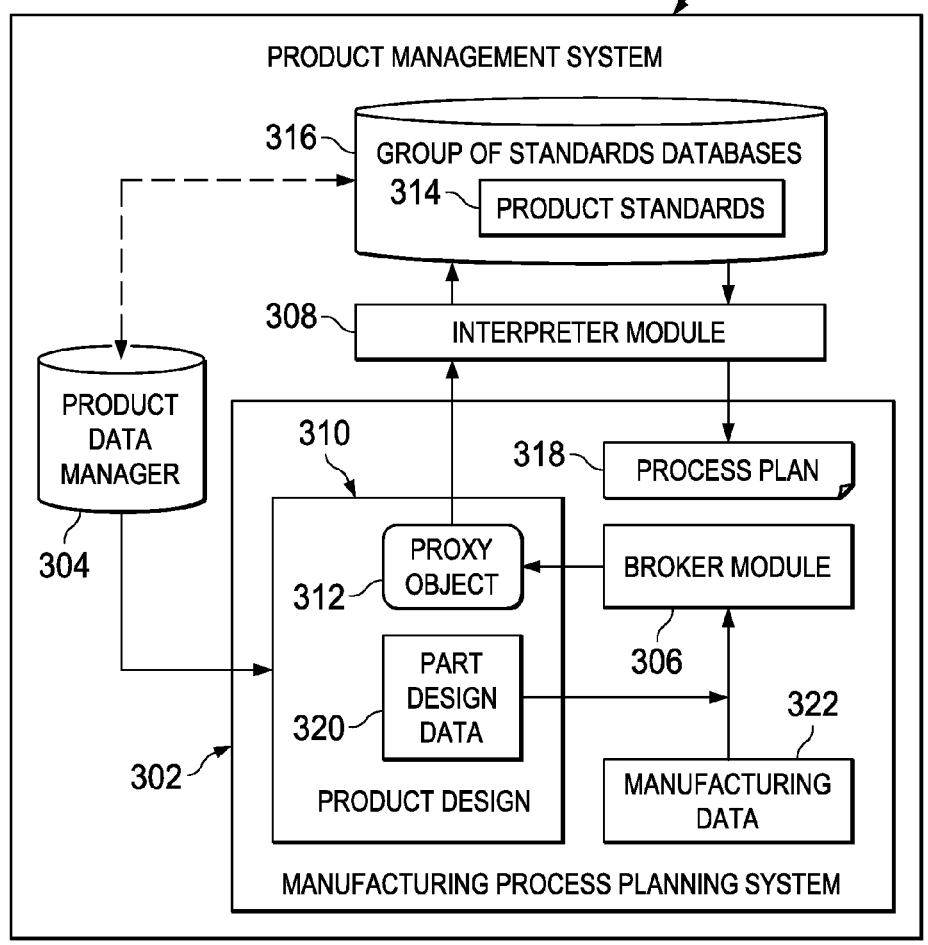

- FasteningHoleInstallation uses: ProxyObject_1, Fastener_1, Washer_1, Hole_1, Hole_2
- Hole_1 isFeatureOf: Part_1
- Hole_2 isFeatureOf: Part_2
- Part_1 hasMaterial: RawMaterial_1
- Part_2 hasMaterial: RawMaterial_2
- RawMaterial_1 type: metallic
- RawMaterial_2 type: metallic

- MessageName: resolveReference
- Role: processPlanner
- ProcessSpecification: "BAC5009"
- Operation: "fastener installation"
- UsePreLoadIndicatingWasher: "false"
- Lubricants: "none"

- ProcessSpecification: "BAC5009"
- Role: "processPlanner"
- Operation: "fastener installation"
- UsePreLoadIndicatingWasher: "false"
- Lubricants: "none"
- NonMetallicStructure: "false"
- FaySealed: "false"
- BoltPartNumber: "bolt1234"
- NutPartNumber: "nut4567"
- TurningFromHead: "false"

1200

ROLE-BASED PRODUCT MANAGEMENT SYSTEM USING PROXY OBJECTS

BACKGROUND INFORMATION

1. Field

The present disclosure relates generally to managing products and, in particular, to managing products using product designs. Still more particularly, the present disclosure relates to managing products using product designs and standards information obtained from product standards.

2. Background

Product designs are used in performing different types of operations when managing products. Managing a product may include, for example, designing the product, manufacturing the product, performing maintenance operations for the product, inspecting the product, updating information about the product, testing the product, and/or performing other operations for the product.

A product design is a model that can be displayed as a two-dimensional or three-dimensional drawing on a display device. An operator may use a product design for a product to perform, for example, manufacturing operations to make the product. The product design may also be used in performing maintenance operations, rework operations, assembly operations, and/or other suitable types of operations to manage the product.

Typically, a product design includes references to one or more product standards for the product. A product standard defines a set of technical requirements, procedures, and/or methods documented for common and/or repeated use in the design, development, production, and/or support of a product. References to product standards are typically included in the product design. These references may be referred to as "call-outs" to the product standards.

As one illustrative example, a product design may include a reference to a product standard, such as a material specification, to identify a particular material from which a component is to be manufactured. Details about the material, such as engineering properties, procurement restrictions, and/or other information about the material, are included in the material specification.

A reference to a product standard may be created and placed in a product design by an operator, such as a designer and/or some other suitable person, who creates or works on the product design. For example, when planning manufacturing operations to be performed for a product, an operator, such as an engineer, may refer to the product design to identify the operations to be performed. The operator may see a reference to a product standard in the product design. At this time, the operator looks for the product standard that is pointed to by the reference in the product design. Looking up the information in the product standard to obtain the most up-to-date information may take more time and/or effort than desired. Further, when looking up the information, the operator may misinterpret the information in the product standards.

Therefore, it would be advantageous to have a method and apparatus that takes into account at least some of the issues discussed above, as well as possibly other issues.

SUMMARY

In one advantageous embodiment, a product management system comprises a computer system, a processing module in the computer system, and a proxy object in the product design. The processing module is configured to display a product design in the computer system. The proxy object refers to a number of product standards and is associated with a component in the product design. The proxy object is configured to receive user input requesting standards information for the component. The proxy object is configured to identify a role of an operator and obtain the standards information in a format based on the role of the operator such that the standards information is displayed in the computer system.

In another advantageous embodiment, a method is provided for identifying information for a product. User input selecting a proxy object in a product design on a computer system is received. The proxy object refers to a number of product standards used in the product design and is associated with a component in the product design. A role of a user is identified. A request for standards information for the component is sent to an interpreter module. The role of the user is included in the request. The standards information is received in a format based on the role of the operator such that the standards information is displayed in the computer system.

In yet another advantageous embodiment, a product management system comprises a processing module in a computer system, a proxy object, an interpreter module, and a broker module. The processing module is configured to display a product design in the computer system. The proxy object is in the product design. The proxy object refers to a number of product standards and is associated with a component in the product design. The proxy object is configured to receive user input requesting standards information for the component, identify a role of an operator, and obtain the standards information in a format based on the role of the operator such that the standards information is displayed in the computer system. The interpreter module is configured to receive a request from the proxy object, obtain the standards information for the component from a group of standards databases, and return the standards information obtained from the group of standards databases in the format based on the role of the operator to the proxy object. The broker module is configured to obtain data from the product design needed to obtain the standards information and send the data to the proxy object for use by the proxy object to obtain the standards information.

The features, functions, and advantages can be achieved independently in various embodiments of the present disclosure or may be combined in yet other embodiments in which further details can be seen with reference to the following description and drawings.

BRIEF DESCRIPTION OF THE DRAWINGS

The novel features believed characteristic of the advantageous embodiments are set forth in the appended claims. The advantageous embodiments, however, as well as a preferred mode of use, further objectives, and advantages thereof, will best be understood by reference to the following detailed description of an advantageous embodiment of the present disclosure when read in conjunction with the accompanying drawings, wherein:

FIG. 1 is an illustration of a product management environment in accordance with an advantageous embodiment;

FIG. 2 is an illustration of different types of attributes for a proxy in accordance with an advantageous embodiment;

FIG. 3 is an illustration of a product management system in accordance with an advantageous embodiment;

FIG. 10 is an illustration of data in a proxy object sent to an interpreter module in accordance with an advantageous embodiment;

FIG. 11 is an illustration of data in a proxy object sent to an interpreter module in accordance with an advantageous embodiment;

FIG. 12 is an illustration of updated data in a proxy object sent to an interpreter module in accordance with an advantageous embodiment.

DETAILED DESCRIPTION

Figure 4:
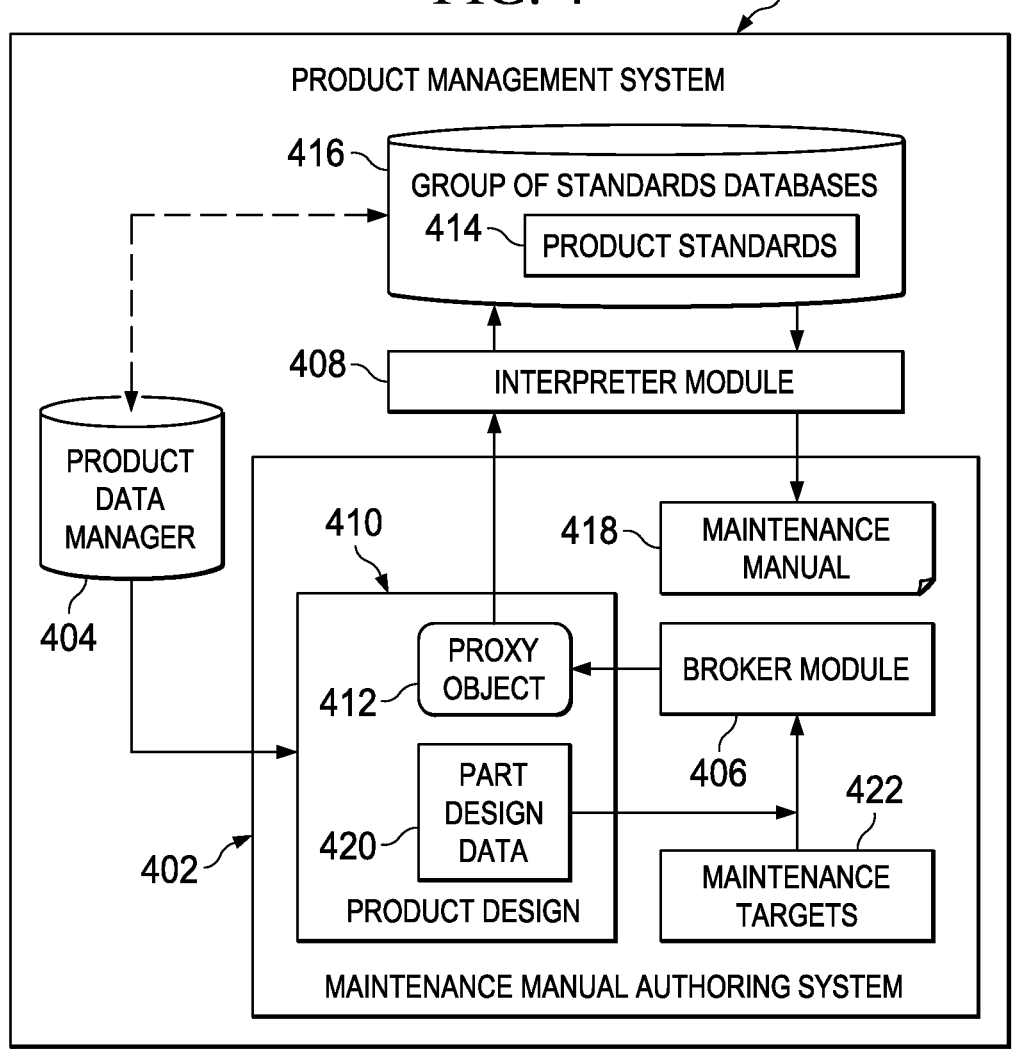
FIG. 4 is an illustration of a product management system in accordance with an advantageous embodiment.

The different advantageous embodiments recognize and take into account a number of different considerations. "A number" as used herein with reference to items, means one or more items. For example, "a number of considerations" is one or more considerations.

The different advantageous embodiments recognize and take into account that product standards referenced in a product design may be located in different locations. In some cases, these locations may be remote to the location where an operator is using the product design. As a result, a particular product standard needed by the operator may not be present at the location where the operator is located.

For example, the product standard may be a paper document or a document stored in a storage device that is not located in the same building where the operator is using the product design. The different advantageous embodiments recognize and take into account that looking up information about components in a product design using product standards stored in various locations may take more time and/or effort than desired. In particular, the time needed to locate and interpret the information in the product standards, as well as convert the information into a format for use by the operator, may take more time and/or effort than desired.

As a result, undesired delays in manufacturing times, inspection times, rework times, and/or assembly times may occur. These undesired delays may lead to undesired increases in the cost for managing products.

Further, different versions of these product standards may be present at the different locations. The different advantageous embodiments recognize and take into account that an operator may not always have access to the most up-to-date version of a product standard. Additionally, an operator may be unable to identify which version of the product standard is the most up-to-date as easily as desired.

The different advantageous embodiments recognize and take into account that information obtained from these product standards may be placed into the product design. The different advantageous embodiments take into account and recognize, however, that placing this information in the product design may result in information being out of date. As a result, operations performed over time using the copy of the information may not be as accurate as desired.

Further, the different advantageous embodiments recognize and take into account that the information in the product design may not be as accurate and/or complete as desired. For example, the copy of the information may contain only a portion of the information needed from the product standards. In this manner, an operator still may need to research the information in the product standards to determine whether the copy of the information is up-to-date and complete. This research may take more time and/or effort than desired.

Still further, the different advantageous embodiments recognize and take into account that embedding information obtained from product standards in a product design may require more space and/or processing resources than desired. The different advantageous embodiments also recognize and take into account that the space needed for storing all of the information obtained from product standards for the product design may be unavailable.

Additionally, the different advantageous embodiments recognize and take into account that the information presented in a product standard may not be in a format based on a role of the operator. In these situations, the operator may need to spend more time than desired converting the format of the information into a format that can be easily used by the operator or ask another operator to format the information for use.

Thus, the different advantageous embodiments provide a method and apparatus for obtaining information from product standards when using product designs that require less time and/or effort than with currently-available systems. In one advantageous embodiment, a product management system comprises a computer system, a processing module in the computer system, and a proxy object in the product design. The processing module is configured to display a product design in the computer system. The proxy object refers to a product standard and is associated with a component in the product design. The proxy object is configured to receive user input requesting standards information for the component. The proxy object is configured to identify the role of the operator and obtain the standards information in a form based on the role of the operator such that the standards information is displayed in the computer system.

With reference now to FIG. 1, an illustration of a product management environment is depicted in accordance with an advantageous embodiment. In these illustrative examples, product management environment 100 is an environment in which product 103 may be managed. As depicted, product management environment 100 includes product management system 102. Product management system 102 is configured to manage product 103 using product design 104.

Product 103 may be, for example, without limitation, an aircraft, an unmanned aerial vehicle, a helicopter, a wing, a fuselage, a landing gear system, a global positioning system receiver, a bracket, and/or some other suitable type of product. In these depicted examples, product design 104 is a model of product 103 comprising components 106 for product 103. For example, product design 104 may be a two-dimensional model of product 103 or a three-dimensional model of product 103. In one illustrative example, product design 104 takes the form of a computer-aided design (CAD) model of product 103.

In these illustrative examples, components 106 in product design 104 may be used in designing, manufacturing, maintaining, inspecting, reworking, and/or otherwise managing product 103. Component 124 is an example of one of components 106 in product design 104. Component 124 may take the form of at least one of a part, a structure, a process, a step, an instruction, an attribute, a value, a parameter, a geometric shape, or some other suitable type of component for a product.

As used herein, the phrase "at least one of", when used with a list of items, means that different combinations of one or more of the listed items may be used and only one of each item in the list may be needed. For example, "at least one of item A, item B, and item C" may include, for example, without limitation, item A, or item A and item B. This example also may include item A, item B, and item C; item B and item C; or just item C.

As depicted, product management system 102 comprises computer system 108. Computer system 108 takes the form of number of computers 110 in these illustrative examples. When more than one computer is present in number of computers 110, these computers may be in communication using a network. For example, number of computers 110 may be computers networked through one or more of a local area network (LAN), a wide area network (WAN), the Internet, and/or some other suitable type of network.

In these illustrative examples, processing module 112, broker module 114, and interpreter module 116, are present in computer system 108. Each of processing module 112, broker module 114, and interpreter module 116 may be implemented using hardware, software, or a combination of the two in these examples.

In these illustrative examples, operator 118 may interact with processing module 112 through number of user input devices 135 and graphical user interface 113. Operator 118 may have role 119. Role 119 for operator 118 may include at least one of, for example, without limitation, a manufacturing engineer, a design engineer, a mechanic, an inspector, a resource planner, an analyst, a product support document author, a maintenance manual author, a standards engineer, a configuration manager, a test and evaluation engineer, and/or some other suitable type of operator.

As depicted, graphical user interface 113 is displayed on display system 115. Display system 115 comprises number of display devices 117. A display device in number of display devices 117 may be selected from at least one of a monitor, a touch screen, a liquid crystal display (LCD), a holographic display device, a portable display device, a head-mounted display device, a virtual reality device, or some other suitable type of display device.

Number of user input devices 135 is configured to interact with graphical user interface 113. Operator 118 may enter user input 136 for use by processing module 112 using number of user input devices 135 and graphical user interface 113. For example, operator 118 may be a design engineer and may enter user input 136 for use by processing module 112 to create product design 104.

When creating product design 104, operator 118 may also create number of proxy objects 121 in product design 104. Each of number of proxy objects 121 is a reference to information stored in one or more of number of sources 128. The information stored in number of sources 128 may be for one or more of components 106 in product design 104. In these illustrative examples, number of sources 128 takes the form of number of product standards 130.

Number of product standards 130 is stored in, for example, group of standards databases 132 in computer system 108. "A group of items", as used herein, is one or more items. In this manner, "a group of standards databases" is one or more standards databases. Group of standards databases 132 may be on different computers in number of computers 110, different networks formed by number of computers 110, and/or on other devices in computers system 108.

In these illustrative examples, number of product standards 130 comprises standards information 122. Standards information 122 for component 124 in components 106 comprises at least one of materials for component 124, dimensions for component 124, a process to manufacture component 124, a process to finish component 124, a process to assemble component 124, a process to rework component 124, inspection information for component 124, maintenance information for component 124, requirements and/or specifications for component 124, and other suitable information for component 124.

Proxy object 120 is an example of one of number of proxy objects 121. In these illustrative examples, proxy object 120 includes attributes 127. Attributes 127 identify information that can be used to identify standards information 122 in number of product standards 130 desired for a particular component, such as component 124, in product design 104. Attributes 127 may also be referred to as keys.

In these illustrative examples, processing module 112 may display product design 104 on graphical user interface 113. In this manner, processing module 112 provides operator 118 access to product design 104.

In these illustrative examples, processing module 112 allows operator 118 to view product design 104, make decisions about product 103 using product design 104, and/or perform other operations for managing product 103 using product design 104. For example, processing module 112 may take the form of a computer-aided process planning system, a manufacturing process planning system, a maintenance manual authoring system, a maintenance planning system, a product manufacturing system, and/or some other suitable type of processing module.

Processing module 112 also provides operator 118 with access to proxy object 120 in product design 104. Proxy object 120 allows operator 118 to request standards information 122 for components 106 in product design 104.

As one illustrative example, proxy object 120 may be displayed in association with component 124 in product design 104 on graphical user interface 113. For example, proxy object 120 may be displayed in association with product design 104 by being displayed as a button next to component 124 in product design 104, being displayed as a callout bubble extending from component 124, and/or being displayed in some other suitable manner. The display of proxy object 120 may be made in any manner such that operator 118 associates proxy object 120 with component 124.

In some illustrative examples, proxy object 120 may be displayed in a new window in response to a selection of component 124 in graphical user interface 113. In other illustrative examples, proxy object 120 may be displayed in a same manner, such as a same color, as the component with which proxy object 120 is associated.

In these illustrative examples, processing module 112 generates a message using user input 136 entered by operator 118 and sends the message to proxy object 120. The message is a request for standards information 122 for component 124 associated with proxy object 120. In these illustrative examples, the message includes role 119 for operator 118. As one illustrative example, user input 136 may include at least one of an identification of role 119, a selection of proxy object 120, and/or other suitable information. In some cases, role 119 may be added to the message without requiring user input 136 that identifies role 119.

Proxy object 120 adds values for attributes 127 for proxy object 120 to the message and then sends the message to interpreter module 116. In these illustrative examples, interpreter module 116 uses the information provided in the message to identify standards information 122 for component 124. In particular, interpreter module 116 determines whether the values for attributes 127 for proxy object 120 provided in the message provide sufficient information for obtaining the standards information 122 desired for component 124.

If interpreter module 116 determines that sufficient information has been provided in the message, interpreter module 116 obtains standards information 122 for component 124 from number of product standards 130 in group of standards databases 132. Further, interpreter module 116 returns standards information 122 to proxy object 120 in a response message in a format based on role 119 of operator 118. Proxy object 120 is updated with standards information 122 for component 124.

Proxy object 120 sends a response message comprising standards information 122 for component 124 to processing module 112 for display in graphical user interface 113. The display of standards information 122 may also be based on role 119 of operator 118.

In some illustrative examples, interpreter module 116 may determine that sufficient information has not been provided in the message received from proxy object 120 to obtain standards information 122 for component 124. In these illustrative examples, interpreter module 116 sends a request for additional information 140 to proxy object 120.

Proxy object 120 may send this request for additional information 140 to broker module 114. Broker module 114 may obtain additional information 140 using product design 104 and send additional information 140 to proxy object 120. In some cases, proxy object 120 uses graphical user interface 113 to receive additional information 140 as user input 136.

Proxy object 120 updates attributes 127 in proxy object 120 using additional information 140. For example, additional attributes may be added to attributes 127 for proxy object 120. Proxy object 120 resends the message to interpreter module 116 requesting standards information 122 for component 124 with the values for the updated attributes for proxy object 120.

Interpreter module 116 uses the information in the message received from proxy object 120 to obtain standards information 122 for component 124. Further, interpreter module 116 sends standards information 122 for component 124 to proxy object 120 in a response message. Proxy object 120 then sends a response message comprising standards information 122 for component 124 to processing module 112 for display on graphical user interface 113.

In this manner, with proxy object 120, operator 118 may obtain standards information 122 for component 124 in product design 104 without needing to know how to directly access number of product standards 130. For example, operator 118 may not need to know how to find standards information 122 for component 124 in group of standards databases 132. Operator 118 also may not need to know in which of group of standards databases 132 the desired standards information is present.

In these illustrative examples, operator 118 may perform operations for managing product 103 using standards information 122. For example, operator 118 may perform operation 142 for product 103 using standards information 122 for component 124. Operation 142 may be, for example, assembling a structure for product 103 using component 124, inspecting the structure using component 124, inspecting component 124, manufacturing component 124, finishing component 124, reworking component 124, and/or some other suitable type of operation for managing product 103.

As one illustrative example, component 124 may be associated with a reference to a process step defined by number of product standards 130. The process step may be, for example, installing a fastener. Operation 142 may involve operating equipment 144 to install the fastener using standards information 122 obtained for this step.

With reference now to FIG. 2, an illustration of different types of attributes for a proxy object is depicted in accordance with an advantageous embodiment. In this illustrative example, attributes 200 are examples of different types of attributes 127 for proxy object 120 in FIG. 1.

As depicted, attributes 200 may include proxy object name 202, product standards keys 204, role-based attributes 206, product design attributes 208, selection criteria 210, and/or other suitable types of attributes. Proxy object name 202 is a name for the proxy object. This name may be identified by the proxy object, by user input, and/or in some other suitable manner.

In these illustrative examples, product standards keys 204 are attributes that specify a particular product standard and/or information provided by the particular product standard. A group of keys in product standards keys 204 for a particular product standard is defined for the particular product standard. In other words, this group of keys and/or values for this group of keys may not match keys for any other product standard.

Role-based attributes 206 include information about a role of an operator, such as role 119 for operator 118 in FIG. 1. This information may be, for example, identifying the role, describing responsibilities of the role, describing a security level for the role, and/or other suitable information about the role. As one illustrative example, one role-based attribute may identify a role for the operator. As another illustrative example, another role-based attribute may identify a number of years of experience for the particular role.

Product design attributes 208 include information about a product. Values for these attributes may be identified using a product design, such as product design 104 in FIG. 1. Product design attributes 208 may include, for example, without limitation, operating temperature, material definition, stock size thickness, part number, and/or other types of product design attributes.

Selection criteria 210 are attributes that provide meta-data for selecting and/or creating the proxy object. For example, selection criteria 210 may include, without limitation, a target operating temperature for a part, a corrosive environment for a part, desired fatigue properties for a part, and/or other types of attributes.

Values for attributes 200 in a proxy object allow an interpreter module, such as interpreter module 116 in FIG. 1, to identify the correct source for the standards information being requested and the component for which the standards information is being requested. In some cases, only values for product standards keys 204 may be needed to identify the correct source for the standards information. In other illustrative examples, values for both product standards keys 204 and product design attributes 208 may be needed.

The illustrations of product management environment 100 in FIG. 1 and attributes 200 in FIG. 2 are not meant to imply physical or architectural limitations to the manner in which an advantageous embodiment may be implemented.

Other components in addition to and/or in place of the ones illustrated may be used. Some components may be unnecessary. Also, the blocks are presented to illustrate some functional components. One or more of these blocks may be combined and/or divided into different blocks when implemented in an advantageous embodiment.

For example, in some illustrative examples, processing module 112 may be configured to display additional product designs in addition to, or in place of, product design 104 in computer system 108. Further, in some illustrative examples, additional proxy objects in addition to or in place of proxy object 120 may be displayed in computer system 108 in association with components in product design 104.

In other illustrative examples, broker module 114 may not be present. For example, operations performed by broker module 114 may be implemented within processing module 112 and/or proxy object 120 in some advantageous embodiments. In still other illustrative examples, different types of processing modules may be used with broker module 114, interpreter module 116, and group of standards databases 132.

Further, additional attributes in addition to the attributes presented for attributes 200 may be present for a proxy object. For example, attributes 200 may include manufacturing options that may be selected using user input. For example, an operator may select whether standards information 122 is needed for torquing a bolt instead of a nut. Another option may be for using a manual drill instead of an automatic drill to perform operations.

With reference now to FIG. 3, an illustration of a product management system is depicted in accordance with an advantageous embodiment. In this illustrative example, product management system 300 is an example of one implementation for product management system 102 in FIG. 1. As depicted, product management system 300 includes manufacturing process planning system 302, product data manager 304, broker module 306, and interpreter module 308.

In this illustrative example, manufacturing process planning system 302 is an example of one implementation for processing module 112 in FIG. 1. Manufacturing process planning system 302 is configured to retrieve product design 310 and proxy object 312 from product data manager 304. Proxy object 312 is associated with a particular component in product design 310 in this depicted example.

Product data manager 304 may store any number of product designs and/or proxy objects. Further, product data manager 304 manages product designs and/or proxy objects which use product standards 314 stored in group of standards databases 316. Group of standards databases 316 is an example of one implementation for group of standards databases 132 in FIG. 1.

Product data manager 304 may be configured to perform a number of different operations. For example, product data manager 304 may be configured to define a bill of material, make associations between proxy objects and corresponding components in a product design, represent proxy objects in product designs, and/or other suitable types of operations.

In some illustrative examples, product data manager 304 may be configured to locally store a portion of the information in product standards 314 stored in group of standards databases 316. In these illustrative examples, the proxy objects in product data manager 304 may be used to validate and/or update the information locally stored by product data manager 304.

In this illustrative example, manufacturing process planning system 302 displays product design 310 and proxy object 312 in association with product design 310. An operator may use product design 310 and/or proxy object 312 to create process plan 318. Process plan 318 is a manufacturing process plan in this illustrative example. In other words, process plan 318 is a list of instructions for manufacturing a product using product design 310.

An operator may request standards information from product standards 314 for use in creating process plan 318. The standards information requested may include, for example, without limitation, tables, quality requirements, environmental health and safety requirements, technical specifications, and/or other suitable information for a component in product design 310.

As one illustrative example, an operator may enter user input requesting standards information for the component associated with proxy object 312. Proxy object 312 sends a request for the standards information to interpreter module 308. The request includes values for attributes for proxy object 312.

In this illustrative example, interpreter module 308 obtains the requested standards information from product standards 314 stored in group of standards databases 316. Interpreter module 308 returns the requested standards information to manufacturing process planning system 302. In particular, interpreter module 308 returns the standards information in a format based on a role of the operator. Further, interpreter module 308 returns the standards information in a format configured for use with process plan 318. In this manner, the operator may integrate the standards information obtained with process plan 318.

In some cases, interpreter module 308 may need additional information, other than the information provided by proxy object 312, to be able to obtain the standards information. When additional data is needed, interpreter module 308 sends a request for the additional information using proxy object 312. Broker module 306 receives the request for the additional information from proxy object 312. In this illustrative example, broker module 306 may obtain the additional information from part design data 320 in product design 310 and/or manufacturing data 322. In some cases, proxy object 312 and/or broker module 306 may obtain the additional information from user input.

Part design data 320 comprises data about individual parts in product design 310. Manufacturing data 322 may be information for creating process plan 318. For example, manufacturing data 322 may include a location at which the manufacturing of the product is to occur, equipment that is available at the location, a number of personnel present at the location performing manufacturing operations, and/or other suitable information.

Manufacturing data 322 may be needed when product standards 314 allow manufacturing options or alternatives that may be chosen by personnel. For example, these manufacturing options may include choice of tools, choice of cleaning solutions, choice of substitute parts, choice of finishing materials, and/or other suitable options.

In this manner, process plan 318 may be created using standards information obtained from product standards 314. This standards information may be obtained without the operator looking up the standards information in the actual product standards or performing research to find the requested standards information.

Proxy object 312 is configured to obtain standards information about a component within product design 310 for the operator. The standards information may be obtained without the operator having to know where product standards 314 are located, how to search for the relevant information, how to convert the standards information into a format for use in process plan 318, and/or other information that requires more time and/or effort than desired.

With reference now to FIG. 4, an illustration of a product management system is depicted in accordance with an advantageous embodiment. In this illustrative example, product management system 400 is an example of one implementation for product management system 102 in FIG. 1. As depicted, product management system 400 includes maintenance manual authoring system 402, product data manager 404, broker module 406, and interpreter module 408.

In this illustrative example, maintenance manual authoring system 402 is an example of one implementation for processing module 112 in FIG. 1. Broker module 406 is an example of one implementation for broker module 114 in FIG. 1. Interpreter module 408 is an example of one implementation for interpreter module 116 in FIG. 1.

Maintenance manual authoring system 402 is configured to retrieve product design 410 and proxy object 412 from product data manager 404. Proxy object 412 is associated with a particular component in product design 410 in this depicted example. Product data manager 404 manages product designs and proxy objects using product standards 414 stored in group of standards databases 416.

In this illustrative example, maintenance manual authoring system 402 displays product design 410 and proxy object 412 in association with product design 410. Product design 410 is for a product for which maintenance manual 418 is to be created. Maintenance manual 418 comprises a list of instructions for performing maintenance operations for the product.

An operator may request standards information from product standards 414 for use in creating maintenance manual 418. For example, an operator may enter user input requesting standards information for the component associated with proxy object 412. Proxy object 412 sends a request to interpreter module 408. The request includes values for attributes for proxy object 412.

In this illustrative example, interpreter module 408 obtains the requested standards information from product standards 414 stored in group of standards databases 416. Interpreter module 408 returns the requested standards information to maintenance manual authoring system 402.

In particular, interpreter module 408 returns the standards information in a format based on a role of the operator. Further, interpreter module 408 returns the standards information in a format configured for use with creating maintenance manual 418. For example, interpreter module 408 may return an instruction that may be directly inserted into maintenance manual 418.

In some cases, interpreter module 408 may need additional information, other than the information provided by proxy object 412, to be able to obtain the standards information. When additional information is needed, interpreter module 408 sends a request for the additional information using proxy object 412. Broker module 406 receives the request for the additional data from proxy object 412.

In this illustrative example, broker module 406 may obtain the additional data from part design data 420 in product design 410, maintenance targets 422, and/or user input. Maintenance targets 422 include manufacturing process operations that are being considered for inclusion in the maintenance manual. For example, a maintenance target may be a cleaning operation, a sealing operation, a fastener installation operation, or some other type of operation that may be re-used when performing maintenance.

In this manner, proxy object 412 takes the place of currently-used references that are shown in product designs. Proxy object 412 is configured to obtain standards information from a product standard as compared to an operator needing to look up the standards information in a product standard based on currently-used references.

Figure 5:
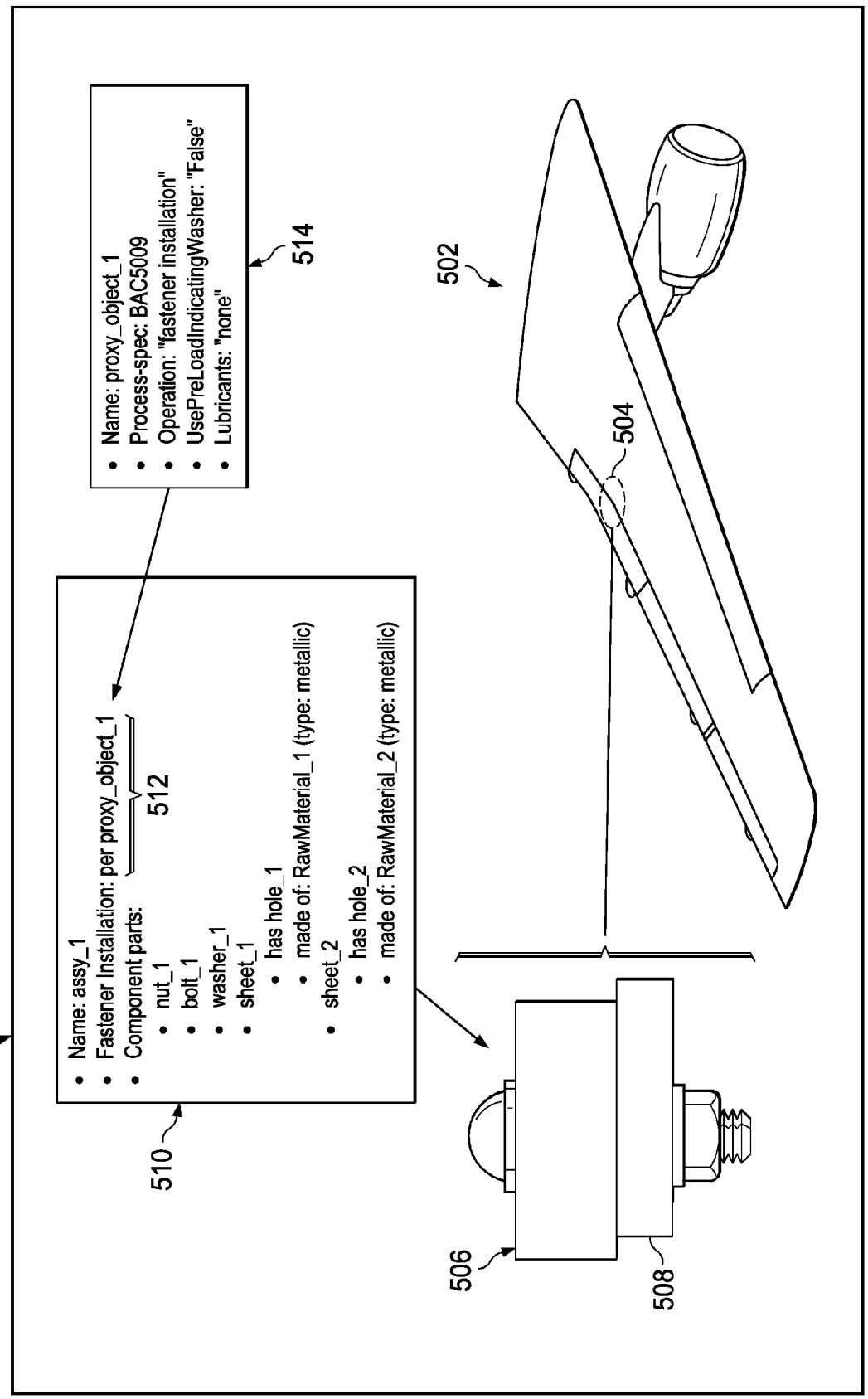
FIG. 5 is an illustration of information provided in a product design in accordance with an advantageous embodiment.

With reference now to FIG. 5, an illustration of information provided in a product design is depicted in accordance with an advantageous embodiment. In this illustrative example, access to information 500 is provided by product design 502. Product design 502 is an example of one implementation for product design 104 in FIG. 1.

In this illustrative example, a selection of section 504 of product design 502 provides access to model 506 for component 508 and description 510 for component 508. As depicted, reference 512 is included in description 510 for component 508. Reference 512 is for proxy object 514. In this illustrative example, proxy object 514 is an example of one implementation for proxy object 120 in FIG. 1.

Figure 6:
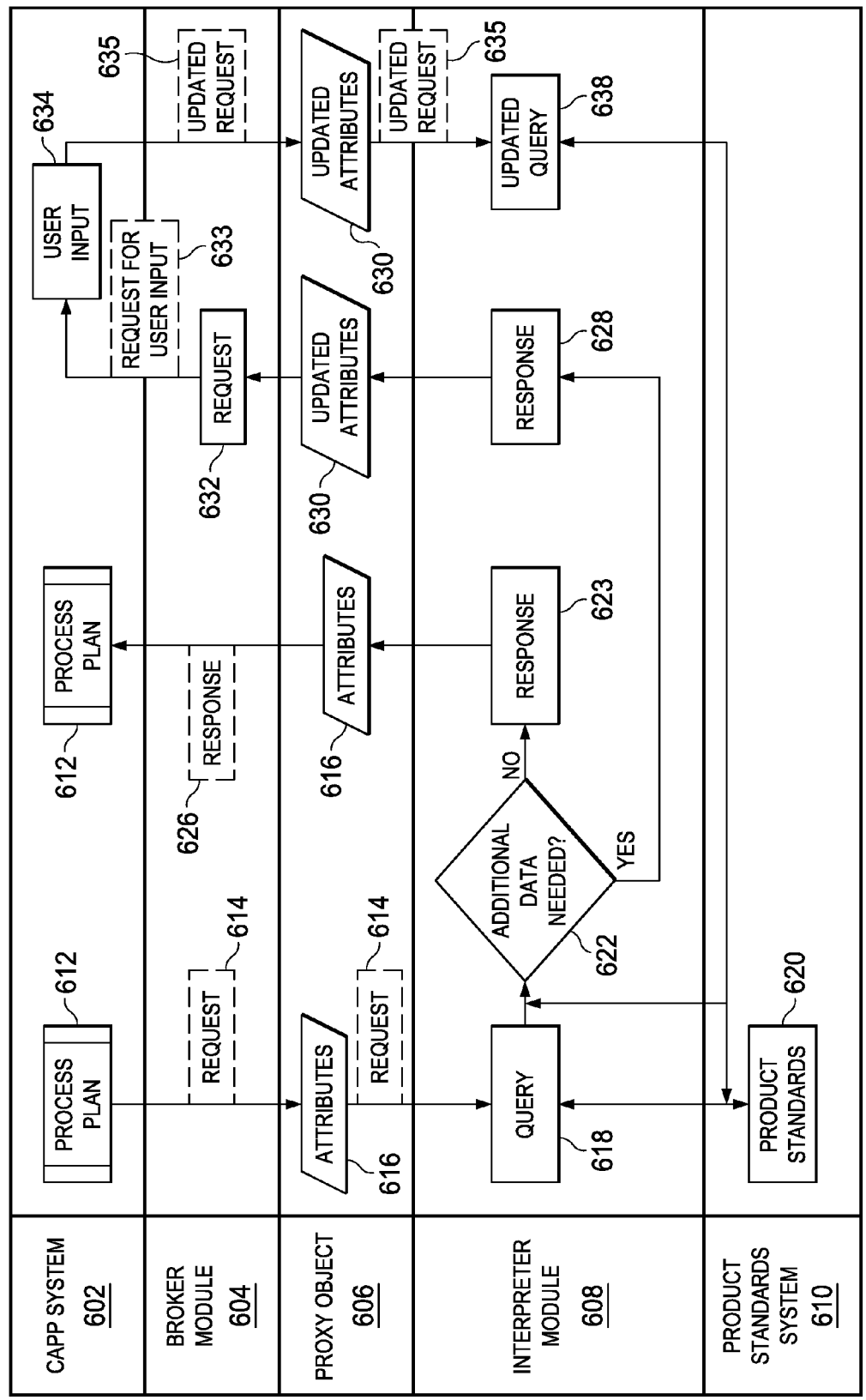
FIG. 6 is an illustration of a data flow for identifying standards information in accordance with an advantageous embodiment.

With reference now to FIG. 6, an illustration of a data flow for identifying standards information is depicted in accordance with an advantageous embodiment. In this illustrative example, computer-aided process planning (CAPP) system 602, broker module 604, proxy object 606, interpreter module 608, and product standards system 610 exchange information.

Computer-aided process planning system 602 may be implemented using processing module 112 in FIG. 1. Broker module 604 may be implemented using broker module 114 in FIG. 1, and interpreter module 608 may be implemented using interpreter module 116 in FIG. 1. Proxy object 606 may be implemented using proxy object 120 in FIG. 1. Further, product standards system 610 may be implemented using number of sources 128 for product standards 130 in FIG. 1.

As depicted, computer-aided process planning system 602 is used by an operator in creating process plan 612. Process plan 612 may be, for example, a manufacturing process plan, a maintenance process plan, an inspection process plan, or some other suitable type of plan. Process plan 612 is created using a product design, such as product design 104 in FIG. 1.

Computer-aided process planning system 602 may receive user input from an operator requesting standards information. Computer-aided process planning system 602 generates request 614 for the standards information using the user input and sends request 614 to proxy object 606.

Proxy object 606 adds values for attributes 616 in proxy object 606 to request 614 and sends request 614 to interpreter module 608. Interpreter module 608 generates query 618 using the information provided in request 614 by proxy object 606. Interpreter module 608 uses query 618 to search for the standards information in product standards 620 in product standards system 610. Product standards 620 are in a format stored in a database in product standards system 610 that can be searched by interpreter module 608. For example, product standards 620 may be represented using extended markup language (XML) and queried using a query language, such as XQuery.

Interpreter module 608 makes determination 622. Determination 622 is made as to whether the information provided in request 614 by proxy object 606 contains sufficient information for identifying the standards information being requested. Determination 622 is based on the results obtained from product standards 620 based on query 618.

If interpreter module 608 determines that the information provided is sufficient, interpreter module 608 generates response 623. Response 623 contains the standards information that has been requested in a format that can be used by process plan 612. Further, the standards information is in a format based on a role of the operator.

Interpreter module 608 sends response 623 to proxy object 606. Proxy object 606 sends the standards information received in response 623 to computer-aided process planning system 602 as response 626. Computer-aided process planning system 602 uses the standards information in response 626 for use in process plan 612.

When making determination 622, if interpreter module 608 determines that additional information is needed, interpreter module 608 generates response 628 and sends response 628 to proxy object 606. Proxy object 606 uses response 628 to generate updated attributes 630. Updated attributes 630 include attributes 616 and additional attributes for which values are needed for the additional attributes. Proxy object 606 sends request 632 to broker module 604 containing updated attributes 630.

Broker module 604 uses request 632 to obtain the additional information needed. For example, broker module 604 may obtain the information directly from the product design in which proxy object 606 is located and/or may send request for user input 633 to computer-aided process planning system 602. Request for user input 633 may be displayed to an operator in these illustrative examples.

Computer-aided process planning system 602 receives user input 634 containing the additional information and sends user input 634 to broker module 604. Broker module 604 generates updated request 635 for standards information using the additional information provided in user input 634. Broker module 604 sends updated request 635 to proxy object 606.

Proxy object 606 identifies values for the additional attributes in updated attributes 630 for proxy object 606 using updated request 635. Proxy object 606 includes the values for updated attributes 630 in updated request 635 and sends updated request 635 to interpreter module 608. Interpreter module 608 generates updated query 638 and applies updated query 638 to product standards 620 in product standards system 610 and again makes determination 622.

In this manner, broker module 604, proxy object 606, and interpreter module 608 work together to obtain the standards information needed for creating process plan 612. In this illustrative example, user input 634 is used to provide additional information but does not need to contain information specifically referencing a particular product standard in product standards 620.

The illustration of data flow in FIG. 6 is not meant to imply limitations to the manner in which an advantageous embodiment may be implemented. For example, in some illustrative examples, a proxy object manager may be configured to manage proxy object 606. Managing proxy object 606 may include, for example, receiving request 614 from computer-aided process planning system 602, sending request 614 to interpreter module 608, updating attributes 616 for proxy object 606, and/or other suitable types of operations.

Figure 7:
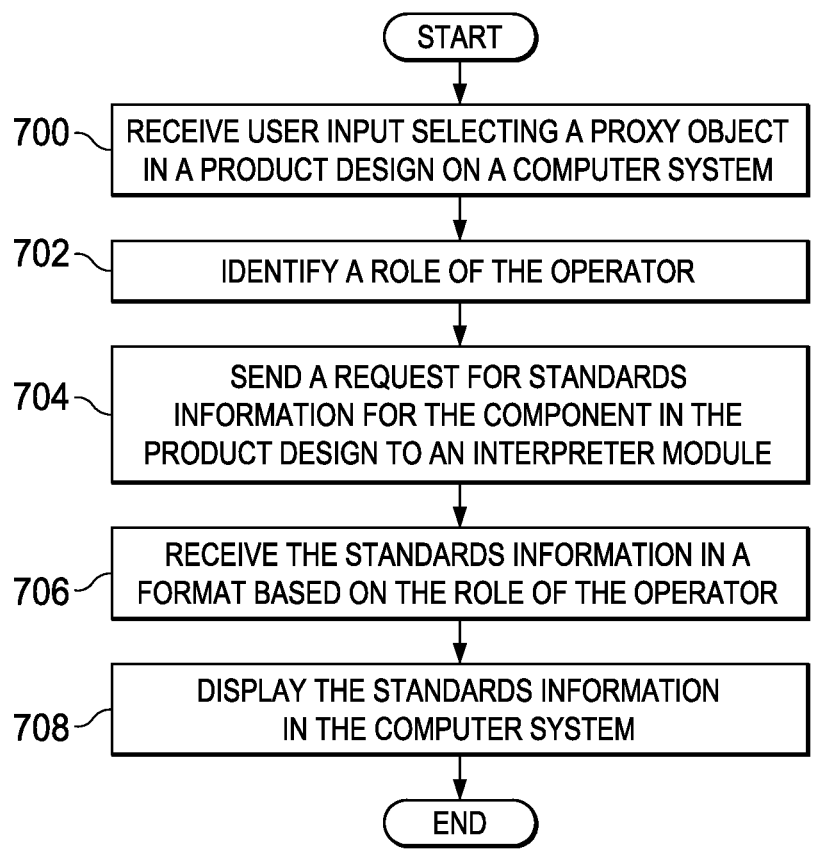
FIG. 7 is an illustration of a flowchart of a process for identifying information for a product in accordance with an advantageous embodiment.

With reference now to FIG. 7, an illustration of a flowchart of a process for identifying information for a product is depicted in accordance with an advantageous embodiment. The process illustrated in FIG. 7 may be implemented using product management system 102 in FIG. 1.

The process begins by receiving user input selecting a proxy object in a product design on a computer system (operation 700). The proxy object and the product design may be displayed on a graphical user interface, such as graphical user interface 113 displayed on display system 115 in FIG. 1. The user input is entered by an operator using a number of input devices that are configured to interact with the graphical user interface. In operation 700, the proxy object refers to a product standard used in the product design and is associated with a component in the product design.

The process then identifies a role of the operator (operation 702). The process sends a request for standards information for the component in the product design to an interpreter module (operation 704). The role of the user is included in the request.

Thereafter, the process receives the standards information in a format based on the role of the operator (operation 706). The standards information is displayed in the computer system (operation 708), with the process terminating thereafter.

Figure 8:
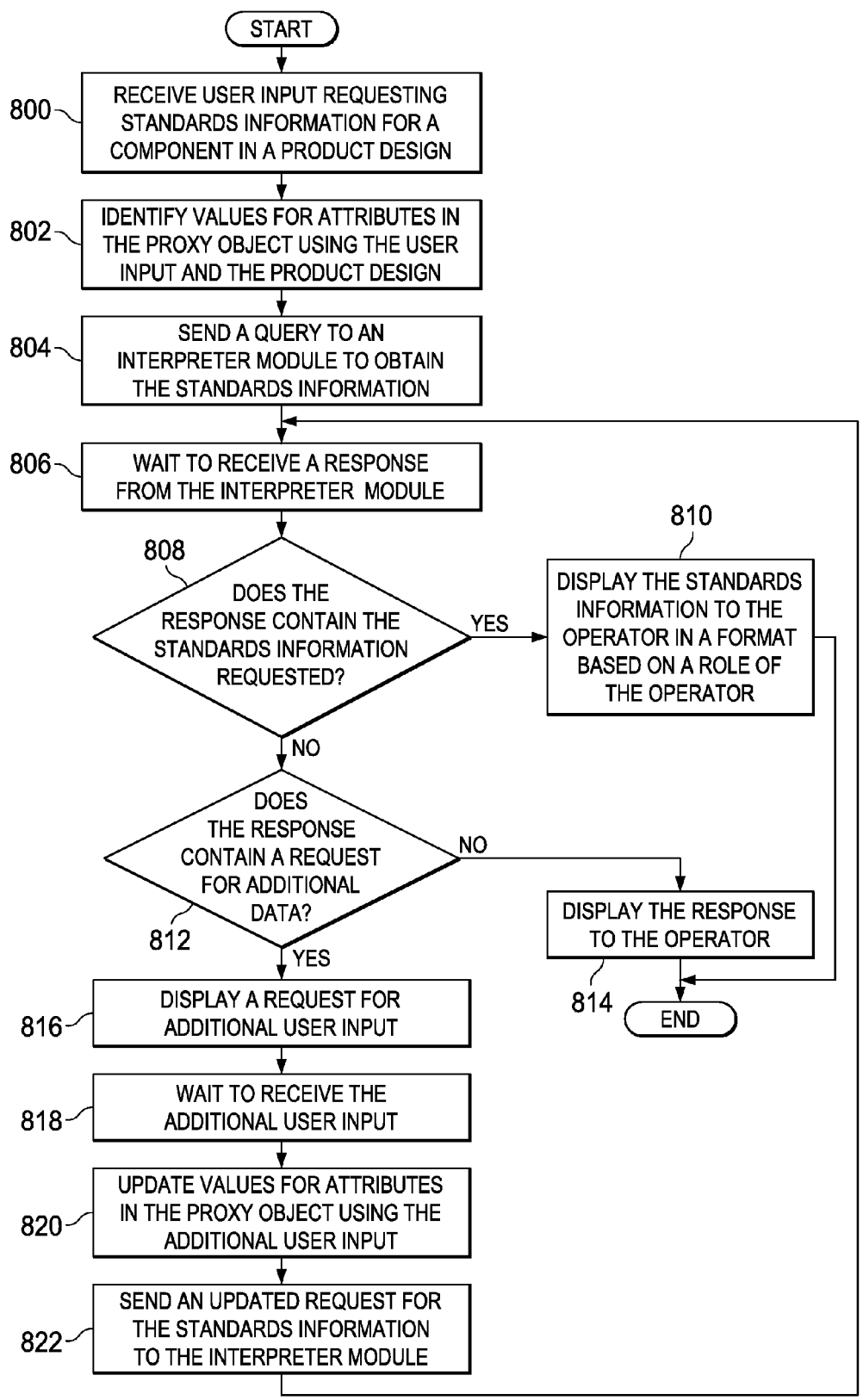
FIG. 8 is an illustration of a flowchart of a process for obtaining standards information in accordance with an advantageous embodiment.

With reference now to FIG. 8, an illustration of a flowchart of a process for obtaining standards information is depicted in accordance with an advantageous embodiment. The process illustrated in FIG. 8 may be implemented using proxy object 120 in FIG. 1.

The process receives user input requesting standards information for a component in a product design (operation 800). The process then identifies values for attributes in the proxy object using the user input and the product design (operation 802). These values form data that may be used to access product standards.

The process then sends a query to an interpreter module to obtain the standards information requested (operation 804). The query contains the data in the proxy object. Next, the process waits to receive a response from the interpreter module (operation 806).

Thereafter, in response to receiving a response from the interpreter module, the process determines whether the response contains the standards information requested (operation 808). If the response contains the standards information, the process displays the standards information to the operator in a format based on a role of the operator (operation 810), with the process terminating thereafter.

Otherwise, if the response does not contain the standards information, the process determines whether the response contains a request for additional data (operation 812). If the response is not a request for additional data, the process displays the response to the operator (operation 814), with the process terminating thereafter.

Otherwise, if the response is a request for additional data, the process displays a request for additional user input (operation 816). The process then waits to receive the additional user input (operation 818).

Thereafter, the process updates values for attributes in the proxy object using the additional user input (operation 820). The process then sends an updated request for the standards information to the interpreter module (operation 822). The updated request contains the additional data requested by the interpreter module. Next, the process proceeds to operation 806 as described above.

Figure 9:
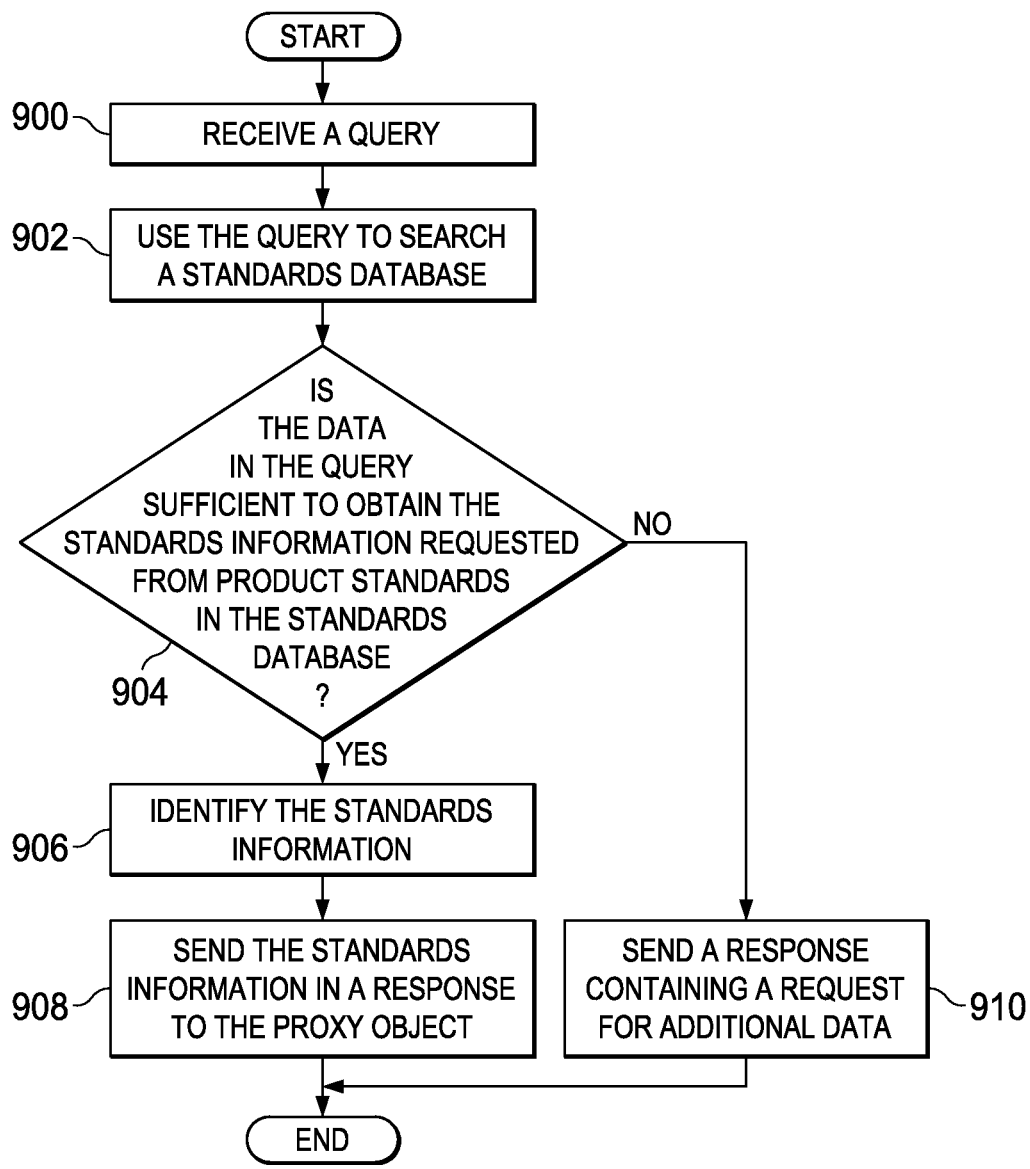
FIG. 9 is an illustration of a flowchart of a process for searching product standards for standards information in accordance with an advantageous embodiment.

With reference now to FIG. 9, an illustration of a flowchart of a process for searching product standards for standards information is depicted in accordance with an advantageous embodiment. The process illustrated in FIG. 9 may be implemented using interpreter module 116 in FIG. 1.

The process begins by receiving a query (operation 900). In this illustrative example, the query in operation 900 may be the query sent by a proxy object in operation 804 in FIG. 8. The query is for obtaining standards information.

The process then uses the query to search a standards database (operation 902). The standards database stores product standards for a product. The query contains data that may be used to search the standards database. Next, the process determines whether the data in the query is sufficient to obtain the standards information requested from product standards in the standards database (operation 904).

If the data in the query is sufficient, the process identifies the standards information (operation 906). The process then sends the standards information in a response to the proxy object (operation 908), with the process terminating thereafter. With reference again to operation 904, if the data in the query is not sufficient, the process sends a response containing a request for additional data (operation 910), with the process terminating thereafter.

The flowcharts and block diagrams in the different depicted embodiments illustrate the architecture, functionality, and operation of some possible implementations of apparatus and methods in an advantageous embodiment. In this regard, each block in the flowcharts or block diagrams may represent a module, segment, function, and/or a portion of an operation or step. For example, one or more of the blocks may be implemented as program code, in hardware, or a combination of the program code and hardware. When implemented in hardware, the hardware may, for example, take the form of integrated circuits that are manufactured or configured to perform one or more operations in the flowcharts or block diagrams.

In some alternative implementations of an advantageous embodiment, the function or functions noted in the block may occur out of the order noted in the figures. For example, in some cases, two blocks shown in succession may be executed substantially concurrently, or the blocks may sometimes be executed in the reverse order, depending upon the functionality involved. Also, other blocks may be added in addition to the illustrated blocks in a flowchart or block diagram.

With reference now to FIG. 10, an illustration of a proxy object is depicted in accordance with an advantageous embodiment. In this illustrative example, proxy object 1000 is an example of one implementation for proxy object 120 in FIG. 1. In this depicted example, proxy object 1000 has the object name of ProxyObject_1. Proxy object 1000 with the object name ProxyObject_1 may be applied to a product design by defining product relationships 1002 in a product definition.

With reference now to FIG. 11, an illustration of data in a proxy object sent to an interpreter module is depicted in accordance with an advantageous embodiment. In this illustrative example, data 1100 in proxy object 1102 is an example of one implementation for attributes 616 in proxy object 606 sent to interpreter module 608 in FIG. 6.

Turning now to FIG. 12, an illustration of updated data in a proxy object sent to an interpreter module is depicted in accordance with an advantageous embodiment. In this illustrative example, updated data 1200 in proxy object 1202 is an example of updated attributes 630 in proxy object 606 sent to interpreter module 608 in FIG. 6.

Figure 13:
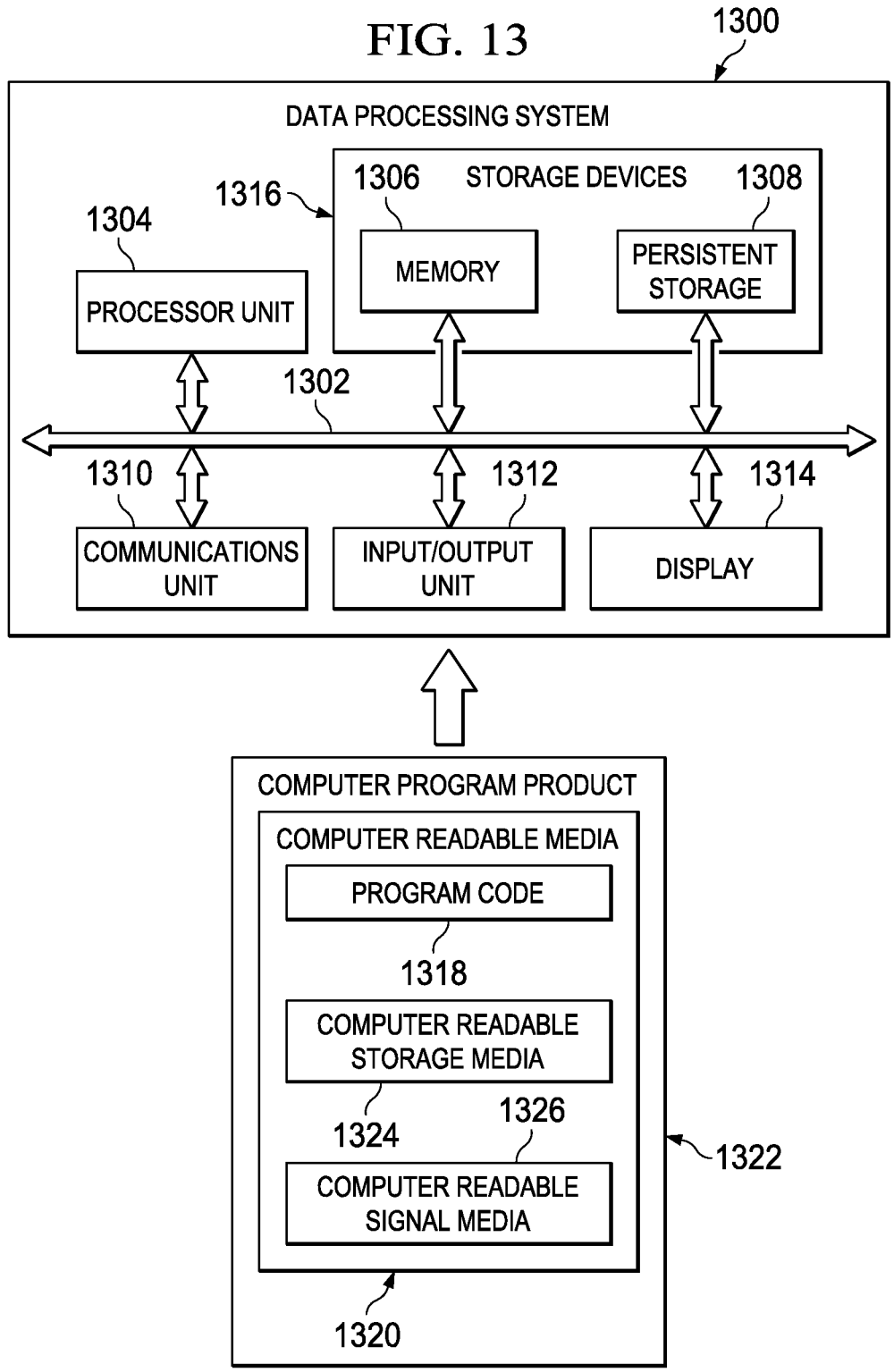
FIG. 13 is an illustration of a data processing system in accordance with an advantageous embodiment.

Turning now to FIG. 13, an illustration of a data processing system is depicted in accordance with an advantageous embodiment. In this illustrative example, data processing system 1300 includes communications fabric 1302, which provides communications between processor unit 1304, memory 1306, persistent storage 1308, communications unit 1310, input/output (I/O) unit 1312, and display 1314. Data processing system 1300 is an example of a data processing system that may be used to implement one or more computers in number of computers 110 in computer system 108 in FIG. 1.

Processor unit 1304 serves to execute instructions for software that may be loaded into memory 1306. Processor unit 1304 may be a number of processors, a multi-processor core, or some other type of processor, depending on the particular implementation. A number, as used herein with reference to an item, means one or more items. Further, processor unit 1304 may be implemented using a number of heterogeneous processor systems in which a main processor is present with secondary processors on a single chip. As another illustrative example, processor unit 1304 may be a symmetric multi-processor system containing multiple processors of the same type.

Memory 1306 and persistent storage 1308 are examples of storage devices 1316. A storage device is any piece of hardware that is capable of storing information, such as, for example, without limitation, data, program code in functional form, and/or other suitable information either on a temporary basis and/or a permanent basis. Storage devices 1316 may also be referred to as computer readable storage devices in these examples. Memory 1306, in these examples, may be, for example, a random access memory or any other suitable volatile or non-volatile storage device. Persistent storage 1308 may take various forms, depending on the particular implementation.

For example, persistent storage 1308 may contain one or more components or devices. For example, persistent storage 1308 may be a hard drive, a flash memory, a rewritable optical disk, a rewritable magnetic tape, or some combination of the above. The media used by persistent storage 1308 also may be removable. For example, a removable hard drive may be used for persistent storage 1308.

Communications unit 1310, in these examples, provides for communications with other data processing systems or devices. In these examples, communications unit 1310 is a network interface card. Communications unit 1310 may provide communications through the use of either or both physical and wireless communications links.

Input/output unit 1312 allows for input and output of data with other devices that may be connected to data processing system 1300. For example, input/output unit 1312 may provide a connection for user input through a keyboard, a mouse, and/or some other suitable input device. Further, input/output unit 1312 may send output to a printer. Display 1314 provides a mechanism to display information to a user.

Instructions for the operating system, applications, and/or programs may be located in storage devices 1316, which are in communication with processor unit 1304 through communications fabric 1302. In these illustrative examples, the instructions are in a functional form on persistent storage 1308. These instructions may be loaded into memory 1306 for execution by processor unit 1304. The processes of the different embodiments may be performed by processor unit 1304 using computer-implemented instructions, which may be located in a memory, such as memory 1306.

These instructions are referred to as program code, computer usable program code, or computer readable program code that may be read and executed by a processor in processor unit 1304. The program code in the different embodiments may be embodied on different physical or computer readable storage media, such as memory 1306 or persistent storage 1308.

Program code 1318 is located in a functional form on computer readable media 1320 that is selectively removable and may be loaded onto or transferred to data processing system 1300 for execution by processor unit 1304. Program code 1318 and computer readable media 1320 form computer program product 1322 in these examples. In one example, computer readable media 1320 may be computer readable storage media 1324 or computer readable signal media 1326. Computer readable storage media 1324 may include, for example, an optical or magnetic disk that is inserted or placed into a drive or other device that is part of persistent storage 1308 for transfer onto a storage device, such as a hard drive, that is part of persistent storage 1308.

Computer readable storage media 1324 also may take the form of a persistent storage, such as a hard drive, a thumb drive, or a flash memory, that is connected to data processing system 1300. In some instances, computer readable storage media 1324 may not be removable from data processing system 1300. In these examples, computer readable storage media 1324 is a physical or tangible storage device used to store program code 1318 rather than a medium that propagates or transmits program code 1318. Computer readable storage media 1324 is also referred to as a computer readable tangible storage device or a computer readable physical storage device. In other words, computer readable storage media 1324 is a media that can be touched by a person.

Alternatively, program code 1318 may be transferred to data processing system 1300 using computer readable signal media 1326. Computer readable signal media 1326 may be, for example, a propagated data signal containing program code 1318. For example, computer readable signal media 1326 may be an electromagnetic signal, an optical signal, and/or any other suitable type of signal. These signals may be transmitted over communications links, such as wireless communications links, optical fiber cable, coaxial cable, a wire, and/or any other suitable type of communications link. In other words, the communications link and/or the connection may be physical or wireless in the illustrative examples.

In some advantageous embodiments, program code 1318 may be downloaded over a network to persistent storage 1308 from another device or data processing system through computer readable signal media 1326 for use within data processing system 1300. For instance, program code stored in a computer readable storage medium in a server data processing system may be downloaded over a network from the server to data processing system 1300. The data processing system providing program code 1318 may be a server computer, a client computer, or some other device capable of storing and transmitting program code 1318.

The different components illustrated for data processing system 1300 are not meant to provide architectural limitations to the manner in which different embodiments may be implemented. The different advantageous embodiments may be implemented in a data processing system including components in addition to or in place of those illustrated for data processing system 1300. Other components shown in FIG. 13 can be varied from the illustrative examples shown. The different embodiments may be implemented using any hardware device or system capable of running program code. As one example, the data processing system may include organic components integrated with inorganic components and/or may be comprised entirely of organic components excluding a human being. For example, a storage device may be comprised of an organic semiconductor.

In another illustrative example, processor unit 1304 may take the form of a hardware unit that has circuits that are manufactured or configured for a particular use. This type of hardware may perform operations without needing program code 1318 to be loaded into a memory from a storage device to be configured to perform the operations.

For example, when processor unit 1304 takes the form of a hardware unit, processor unit 1304 may be a circuit system, an application specific integrated circuit (ASIC), a programmable logic device, or some other suitable type of hardware configured to perform a number of operations. With a programmable logic device, the device is configured to perform the number of operations. The device may be reconfigured at a later time or may be permanently configured to perform the number of operations. Examples of programmable logic devices include, for example, a programmable logic array, a programmable array logic, a field programmable logic array, a field programmable gate array, and other suitable hardware devices. With this type of implementation, program code 1318 may be omitted, because the processes for the different embodiments are implemented in a hardware unit.

In still another illustrative example, processor unit 1304 may be implemented using a combination of processors found in computers and hardware units. Processor unit 1304 may have a number of hardware units and a number of processors that are configured to run program code 1318. With this depicted example, some of the processes may be implemented in the number of hardware units, while other processes may be implemented in the number of processors.

In another example, a bus system may be used to implement communications fabric 1302 and may be comprised of one or more buses, such as a system bus or an input/output bus. Of course, the bus system may be implemented using any suitable type of architecture that provides for a transfer of data between different components or devices attached to the bus system.

Additionally, a communications unit may include a number of devices that transmit data, receive data, or transmit and receive data. A communications unit may be, for example, a modem or a network adapter, two network adapters, or some combination thereof. Further, a memory may be, for example, memory 1306, or a cache, such as found in an interface and memory controller hub that may be present in communications fabric 1302.

Thus, the different advantageous embodiments provide a method and apparatus for obtaining information from product standards when using product designs that require less time and/or effort than with currently-available systems. In one advantageous embodiment, a product management system comprises a computer system, a processing module in the computer system, and a proxy object in the product design.

The processing module is configured to display a product design in the computer system. The proxy object refers to a product standard and is associated with a component in the product design. The proxy object is configured to receive user input requesting standards information for the component. The proxy object is configured to identify the role of the operator and obtain the standards information in a form based on the role of the operator such that the standards information is displayed in the computer system.

The description of the different advantageous embodiments has been presented for purposes of illustration and description and is not intended to be exhaustive or limited to the embodiments in the form disclosed. Many modifications and variations will be apparent to those of ordinary skill in the art. Further, different advantageous embodiments may provide different advantages as compared to other advantageous embodiments. The embodiment or embodiments selected are chosen and described in order to best explain the principles of the embodiments, the practical application, and to enable others of ordinary skill in the art to understand the disclosure for various embodiments with various modifications as are suited to the particular use contemplated.

What is claimed is:

1. A product management system comprising:
   a computer system;
   a processing module in the computer system, wherein the processing module is configured to display a product design in the computer system; and
   a proxy object in the product design, wherein the proxy object refers to a number of product standards and is associated with a component in the product design and wherein the proxy object is configured to receive user input requesting standards information for the component; identify a role of an operator; and obtain the standards information in a format based on the role of the operator such that the standards information is displayed in the computer system.

2. The product management system of claim 1 further comprising:
   a group of standards databases in the computer system; and
   an interpreter module in the computer system, wherein the interpreter module is configured to receive a request from the proxy object, obtain the standards information for the component from the group of standards databases; and return the standards information obtained from the group of standards databases in the format based on the role of the operator.

3. The product management system of claim 1 further comprising:
   a broker module configured to obtain first data from at least one of: 1) the product design and 2) manufacturing data for the product design needed to obtain the standards information, the broker module further configured to send the first data to the proxy object for use by the proxy object to obtain the standards information.

4. The product management system of claim 3, wherein in being configured to obtain the standards information in the format based on the role of the operator such that the standards information is displayed in the computer system, the proxy object is configured to send a request to an interpreter module that is configured to receive the request from the proxy object; obtain the standards information for the component from a group of standards databases; and return the standards information from the group of standards databases in the format based on the role of the operator.

5. The product management system of claim 4, wherein the proxy object is configured to receive a request from the interpreter module for additional data needed to obtain the standards information and return the additional data to the interpreter module.

6. The product management system of claim 5, wherein the proxy object is configured to request the additional data using at least one of the broker module and a graphical interface configured to receive the additional data as the user input.

7. The product management system of claim 1, wherein the processing module is selected from one of a computer-aided process planning system, a maintenance planning system, and a product manufacturing system.

8. The product management system of claim 1, wherein the standards information comprises at least one of materials for the component, dimensions for the component, a process to manufacture the component, a process to finish the component, a process to assemble the component, inspection information for the component, and maintenance information for the component.

9. The product management system of claim 3, wherein the broker module is configured to receive the standards information and send the standards information to the processing module for display.

10. The product management system of claim 1, wherein the product design is selected from one of a two-dimensional model of a product and a three-dimensional model of the product.

11. A method for identifying information for a product, the method comprising:
    receiving user input selecting a proxy object in a product design on a computer system, wherein the proxy object refers to a number of product standards used in the product design and is associated with a component in the product design;
    identifying a role of a user;
    sending a request for standards information for the component to an interpreter module, wherein the role of the user is included in the request;
    receiving the standards information in a format based on the role of the operator; and
    displaying the standards information in the computer system.

12. The method of claim 11 further comprising:
    performing an operation for the component using the standards information.

13. The method of claim 11 further comprising:
    receiving the request for the standards information for the component, obtaining the standards information for the component from a group of standards databases; and returning the standards information obtained from the group of standards databases in the format based on the role of the user.

14. The method of claim 11 further comprising:
    obtaining data from the product design needed to obtain the standards information and send the data to the proxy object for use by the proxy object to obtain the standards information.

15. The method of claim 14 further comprising:
    receiving a request from the interpreter module for additional data needed to obtain the standards information and return the additional data to the interpreter module.

16. The method of claim 15 further comprising:
    requesting the additional data using at least one of a broker module and a graphical user interface configured to receive the additional data as the user input.

17. The method of claim 11, wherein the standards information comprises at least one of materials for the component, dimensions for the component, a process to manufacture the component, a process to finish the component, a process to assemble the component, inspection information for the component, and maintenance information for the component.

18. A product management system comprising:
    a processing module in a computer system, wherein the processing module is configured to display a product design in the computer system;
    a proxy object in the product design, wherein the proxy object refers to a number of product standards and is associated with a component in the product design and wherein the proxy object is configured to receive user input requesting standards information for the component; identify a role of an operator; and obtain the standards information in a format based on the role of the operator such that the standards information is displayed in the computer system;

an interpreter module configured to receive a request from the proxy object; obtain the standards information for the component from a group of standards databases; and return the standards information obtained from the group of standards databases in the format based on the role of the operator to the proxy object; and a broker module configured to obtain data from the product design needed to obtain the standards information and send the data to the proxy object for use by the proxy object to obtain the standards information.

19. The product management system of claim 18, wherein the proxy object is configured to receive a request from the interpreter module for additional data needed to obtain the standards information and return the additional data to the interpreter module.

20. The product management system of claim 19, wherein the proxy object is configured to request the additional data using at least one of the broker module and a graphical user interface configured to receive the additional data as the user input.

* * * * *